US007306496B1

(12) United States Patent
Carmen et al.

(10) Patent No.: US 7,306,496 B1
(45) Date of Patent: Dec. 11, 2007

(54) TROLLING MOTOR WITH DIAGNOSTIC SYSTEM

(75) Inventors: Eric J. Carmen, Tulsa, OK (US); Mikel E. Janitz, Collinsville, OK (US); Justin Nguyen, Broken Arrow, OK (US)

(73) Assignee: Brunswick Corporation, Lake Forest, IL (US)

( * ) Notice: Subject to any disclaimer, the term of this patent is extended or adjusted under 35 U.S.C. 154(b) by 28 days.

(21) Appl. No.: 11/281,857

(22) Filed: Nov. 17, 2005

(51) Int. Cl.
*B60L 11/00* (2006.01)
*B63H 21/22* (2006.01)
*G06F 19/00* (2006.01)
*G01L 3/26* (2006.01)

(52) U.S. Cl. .............................. 440/6; 440/1; 701/114; 70/116

(58) Field of Classification Search .................... 440/1, 440/6; 73/116; 701/114
See application file for complete search history.

(56) References Cited

U.S. PATENT DOCUMENTS 4,632,662 A * 12/1986 Handa ......................... 440/52
5,892,338 A 4/1999 Moore et al.
6,054,831 A 4/2000 Moore et al.
6,247,980 B1 6/2001 Moore et al.
6,273,771 B1 * 8/2001 Buckley et al. ............... 440/84
6,507,164 B1 1/2003 Healey et al.
6,652,331 B2 11/2003 Healey
6,691,023 B2 * 2/2004 Fujino et al. ............... 701/114
6,775,607 B2 * 8/2004 Koerner ...................... 701/104
6,870,794 B2 3/2005 Healey
6,902,446 B1 6/2005 Healey
6,975,936 B2 * 12/2005 Akuzawa et al. ........... 701/114
2003/0060952 A1 * 3/2003 Kanno et al. ................. 701/29
2004/0090195 A1 * 5/2004 Motsenbocker ............. 318/109

* cited by examiner

*Primary Examiner*—Jesus Sotelo
*Assistant Examiner*—Daniel V. Venne
(74) *Attorney, Agent, or Firm*—Fellers, Snider, Blankenship, Bailey & Tippens, P.C.

(57) ABSTRACT

An apparatus including a trolling motor having at least one operational subsystem and the trolling motor also having an integral electronic controller for controlling the operational subsystem wherein the improvement comprises an integral electronic diagnostic system which will receive diagnostic information from the operational subsystem and will transmit the diagnostic information for reception externally of the trolling motor.

9 Claims, 3 Drawing Sheets

TROLLING MOTOR WITH DIAGNOSTIC SYSTEM

FIELD OF THE INVENTION

The present invention relates to a diagnostic system for a trolling motor and to a trolling motor having a diagnostic system integrally incorporated therein.

BACKGROUND OF THE INVENTION

Trolling motors are commonly used on bass boats, pontoon boats, and other watercraft for fishing or other operations which require a relatively high degree of manueverability along shorelines or in other tight locations. Various types of trolling motor assemblies are known in the art. One common type of trolling motor is a single tube assembly comprising: an electric motor and propeller assembly secured on the lower end of an elongate tube or other column; a control head or housing structure attached in fixed position on the upper end of the column; and an electrical cable extending through the column from the control head to the motor and propeller assembly for operating the motor. The single tube trolling motor will typically be either manually rotated or rotated by external mechanical means for steering the watercraft.

An example of another common type of trolling motor is a rotating tube assembly comprising: a control head or other housing structure having a fixed tube extending from the bottom thereof; a rotatable tube or other rotatable column having an upper end which is received in the control head and a lower end which projects from the lower end of the fixed column; an electric motor and propeller assembly secured on the lower end of the rotatable column; an electrical cable extending through the rotatable column from the control head to the propulsion motor for operating the motor; and a steering motor and gear assembly provided in the control head for rotating the rotatable column in order to turn the motor and propeller assembly for steering the watercraft.

A typical trolling motor presently available in the market will include an integral electronic controller having a central processing unit for controlling and/or monitoring one or more, typically a plurality of, operational subsystems within the motor. Examples of functions typically performed by these subsystems include: steering; propulsion (e.g., motor and propeller speed, forward and reverse, etc.); monitoring and indicating battery status; receiving and decoding control signals from the user interface; and monitoring temperature, current, voltage, and/or other conditions at desired locations. In addition, if the trolling motor is of a type having a depth tracking system incorporated therein for fishing, the central processing unit can also include circuitry linked to the depth tracking system for automatically controlling and displaying steering position and speed. The integral electronic controller can communicate with the operator interface via a cable connection or by radio frequency (RF), infrared (IR), or other wireless communication. Examples of typical user interfaces include, but are not limited to, operator consoles, foot pedals, and key fobs.

Examples of trolling motors having integral electronic controls systems incorporated therein are disclosed in U.S. Pat. No. 5,892,338, U.S. Pat. No. 6,054,831, and U.S. Pat. No. 6,902,446. The entire disclosure of each of these patents is incorporated herein by reference. U.S. Pat. No. 5,892,338 discloses a trolling motor having a receiver circuit included on a control circuit board in the trolling motor control head.

The receiver circuit receives user commands, preferably by RF transmission, from a foot pedal transmitter circuit. The control circuit board also includes a control circuit which controls the operation of a steering subsystem and a thrust subsystem based upon the radio frequency commands.

In the trolling motor of U.S. Pat. No. 5,892,338, the RF receiver circuit is preferably an integrated circuit which receives the user's RF signal commands and develops appropriate digital signals which are then transferred to a receiver microcontroller. The receiver microcontroller in turn develops individual output signals which correspond to the foot pedal signals. The control circuit also utilizes an integrated circuit microcontroller which receives the command signals from the receiver microcontroller and develops appropriate signals for controlling the steering and propulsion subsystems. The control system also includes low battery indicators which provide a flashing signal in the event that there is a problem with the batteries or with the boat wiring system.

U.S. Pat. No. 6,902,446 discloses a DC-powered trolling motor which incorporates an integral pulse width modulation (PWM) controller to control the voltage applied to the motor, and, hence, to control the speed of the motor. The PWM controller is contained in the motor and propeller housing and is therefore submerged during operation. The PWM controller comprises: a microprocessor having analog inputs, a pulse width modulator output, a digital output, and a serial input for receiving motor speed commands from a foot pedal; a reversing relay for changing the polarity of the power applied to the motor; a relay driver for energizing the reversing relay; a solid state switch for energizing the motor; and a current sensor and amplifier for measuring the current flowing through the motor. The controller also includes a temperature sensing device which allows the microprocessor to monitor the temperature of the motor and to adjust the electrical drive to the motor to prevent overheating.

A need exists for a trolling motor diagnostic system that is simple to operate, is highly effective and fast, and requires minimal training and equipment. As the use of electronic controls and systems within trolling motors has become more sophisticated and complex, it has become increasing difficult for assembly line and service technicians to diagnose problems within the trolling motor. To diagnose and address problems effectively, it has been necessary for the technician to possess a thorough understanding of the trolling motor hardware and software and to be versed in the use of sophisticated instruments such as oscilloscopes and digital multimeters. In addition, the equipment necessary for performing diagnostics becomes even more specialized if the trolling motor uses an RF command system. Further, if the integral electronic control system is potted (i.e., sealed in or under a protective covering), only certain select signals are available for external analysis.

Heretofore, integral diagnostic systems capable of being used in trolling motors or other watercraft systems have not been available. Although diagnostic data systems have been used in automobiles, diagnostic systems of this type are not adaptable for use in RF controlled or other types of trolling motors and are incompatible with the open environmental and operational conditions encountered with watercraft systems.

SUMMARY OF THE INVENTION

The present invention satisfies the needs and alleviates the problems discussed above. In one aspect, there is provided an improvement in an apparatus including a trolling motor having at least one operational subsystem and the trolling motor also having an integral electronic controller for controlling the operational subsystem. The improvement comprises: (a) the trolling motor also having an integral electronic diagnostic system which will receive diagnostic information pertaining to the operational subsystem and (b) the integral electronic diagnostic system including a transmitter for transmitting the diagnostic information pertaining to the operational subsystem for reception externally of the trolling motor.

The inventive improvement preferably also comprises a diagnostic data processing system located externally of the trolling motor. The diagnostic data processing system preferably comprises: (a) a wireless receiver which will receive the diagnostic information pertaining to the operational subsystem transmitted by the transmitter and (b) an external computing device for analyzing the diagnostic information pertaining to the operational subsystem.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Before explaining the present invention in detail, it is important to understand that the invention is not limited in its application to the details of the construction illustrated or the steps described herein. The invention is capable of other embodiments and of being practiced or carried out in a variety of ways. The phraseology and terminology employed herein is for purposes of description and not of limitation.

The inventive diagnostic system can be used in conjunction with generally any type of trolling motor having an integral electronic control system. As used herein and in the claims, the term "integral" means that the component, element, or system in question is physically incorporated at some location in the trolling motor itself.

Figures 1, 4:
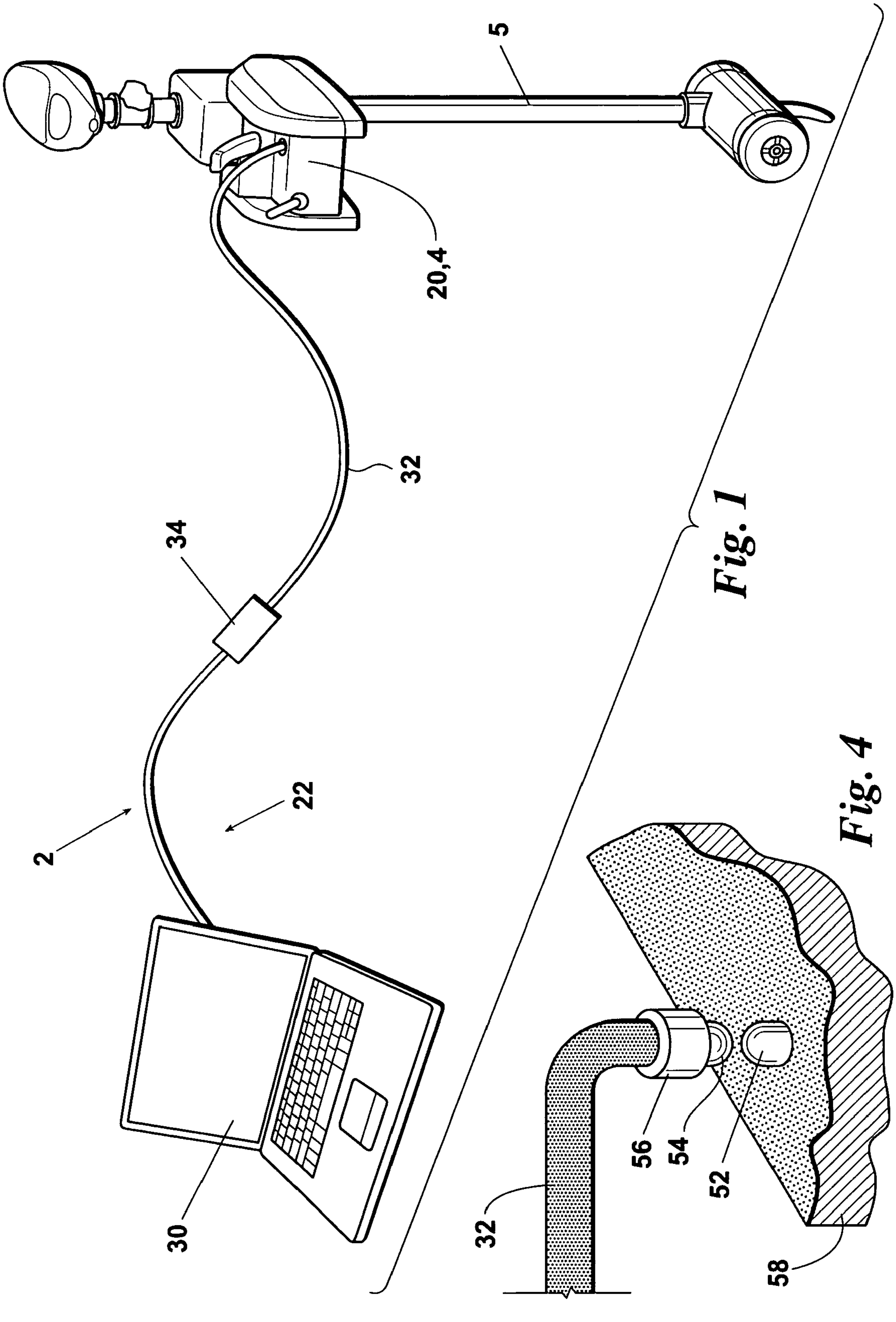
FIG. 1 illustrates an embodiment 2 of the inventive trolling motor diagnostic system.
FIG. 4 schematically illustrates the data transmission system of the inventive diagnostic system 50.
Figure 2:
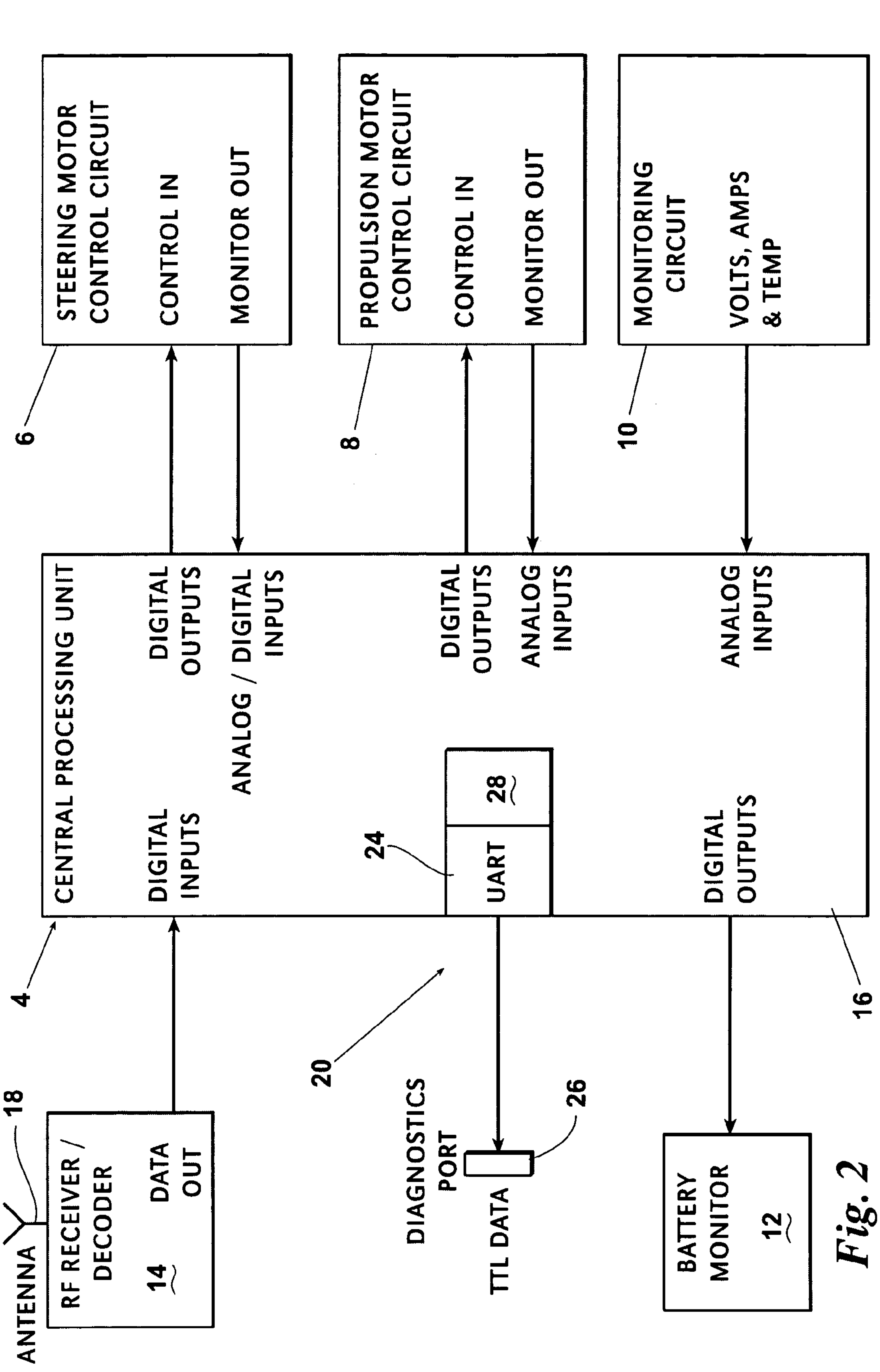
FIG. 2 schematically illustrates an embodiment 20 of the inventive integral electronic diagnostic system incorporated in the trolling motor of inventive apparatus 2.

A trolling motor apparatus incorporating and using an embodiment 2 of the inventive electronic diagnostic system is illustrated in FIGS. 1 and 2. As with other trolling motors heretofore known in the art, the illustrated trolling motor 5 includes: an integral electronic controller 4 (i.e., an electronic controller which is physically incorporated and located in the trolling motor itself) which controls all of the major functions of each of the trolling motor subsystems and/or is aware of the status of the subsystem; an integral steering subsystem 6 typically associated with an internal steering motor for performing steering operations; an integral propulsion system 8 associated with the propulsion motor for performing propulsion operations (e.g., speed, direction, forward, and reverse); one or more monitoring subsystems 10 for monitoring temperature, current, voltage, or other conditions at desired locations within the trolling motor; a power source monitoring subsystem 12 for monitoring the charge or other conditions of the trolling motor battery or other power source; and a command subsystem 14 for receiving operational commands from the watercraft operator.

The integral electronic controller 4 will typically comprise a circuit board or other central processing unit 16 which is electronically linked to all of the operational subsystems 6, 8, 10, 12, and 14 for (a) receiving and decoding command signals from the watercraft operator via the command subsystem 14; (b) transmitting the command signals to the steering, propulsion or other operational subsystems 6 and 8; (c) receiving status and monitoring signals and information from all of the subsystems 6-14; and/or (d) adjusting the operation of the subsystems 6 and 8 based on the status information received and/or activating a low battery indictor or other status indicators for the operator. The integral electronic controller 4 of the trolling motor 5 can also be linked to an automatic depth tracking system (not shown) used for fishing.

The operator's commands can be received by the integral electronic controller 4 via direct cable connection or by radio frequency (RF) transmission, infrared (IR) transmission, or other wireless communication. In this embodiment, the command signal receiving subsystem 14 of the trolling motor 5 includes an antenna 18 for receiving command signals by RF transmission. The operator interface unit used for transmitting command signals to the trolling motor 5 can be an operator console, foot pedal, key fob, or any other device used in the art.

The improvement provided by the present invention is a trolling motor diagnostic system 2 which is capable of transmitting from the trolling motor 5 and analyzing information signals concerning essentially any aspects of the trolling motor 5 and its operational subsystems which can be monitored electronically. The inventive trolling motor diagnostic system 2 comprises (a) an integral electronic diagnostic system 20 which is physically incorporated in the trolling motor 5 and includes a transmitter 24 for transmitting diagnostic information pertaining to the operational subsystems or other features of the trolling motor 5 for reception externally of the trolling motor 5 and (b) a diagnostic data processing system 22 which is located externally of the trolling motor and receives and analyzes the transmitted diagnostic information.

In the embodiment 2 of the present invention illustrated in FIGS. 1 and 2, the inventive integral electronic diagnostic system 20 preferably comprises: an universal asynchronous receiver/transmitter (UART) 24 which is added to or linked to the trolling motor central processing unit 16; a diagnostics port 26 linked to the UART 24; and an internal nonvolatile electronic memory 28 which is included in or linked to the trolling motor central processing unit 16. The internal nonvolatile memory 28 stores historical diagnostic data received from the trolling motor operational subsystems 6-14 and/or from elsewhere in the trolling motor 5. Examples of historical diagnostic data which could be stored in the internal nonvolatile memory 28 include, but are not limited to, the occurrence and duration of over-current conditions, the occurrence and duration of over-temperature conditions, etc.

When the trolling motor 5 is activated, the UART preferably transmits both (a) historical diagnostic information stored in the memory 28, and (b) real time diagnostic information continuously received from the operational subsystems 6-14 and/or from elsewhere in the trolling motor 5.

As will be understood by those in the art, the inventive integral electronic diagnostic system 20 can be readily adapted to continuously and automatically transmit all of the diagnostic information it receives or it can be adapted to transmit at least a portion of the diagnostic information only in response to specific information request code signals received from the external diagnostic data processing system 22. The UART 24 encodes the output diagnostic data and preferably transmits the information at transistor-to-transistor logic (TTL) levels to the diagnostic port connection 26.

The external diagnostic data processing system 22 of the inventive system 2 comprises: a computer, laptop, Palm Pilot®, or other computing and display device 30; a data cable 32 having appropriate connectors on the ends thereof for connection between the integral diagnostic system port 26 and the computing device 30; and a converter 34 for converting the TTL signal to a RS232 level signal or other signal suitable for reception and processing by the computing device 30.

The external computing and display device 30 can be programmed to display and/or analyze the diagnostic information received from the trolling motor 5 in any manner desired. For example, options include: displaying current and historical information in a graphical manner; analyzing data for potential problems and displaying those results when requested by the user; displaying the status of each operational subsystem using color codes such that, e.g., green represents an acceptable condition, orange represents a borderline condition, and red represents a fail condition; displaying parameters such as voltage, current, and temperature for the operational subsystems using graphics which resemble gauges; displaying historical data so that the technician can quickly determine whether the system temperatures, currents, or voltages have exceeded limits which could point to a damaged armature or other problems; displaying the status of a RF or other wireless command link to indicate when commands were received from the operator interface, what buttons where pushed, the serial number of the command transmitter, whether the serial number is stored in the system memory, and/or the system response or lack thereof to the command received; and/or providing a help menu which provides instructions, descriptions of the operational subsystems, diagnostic tips, wiring diagrams, and/or other helpful information.

Figure 3:
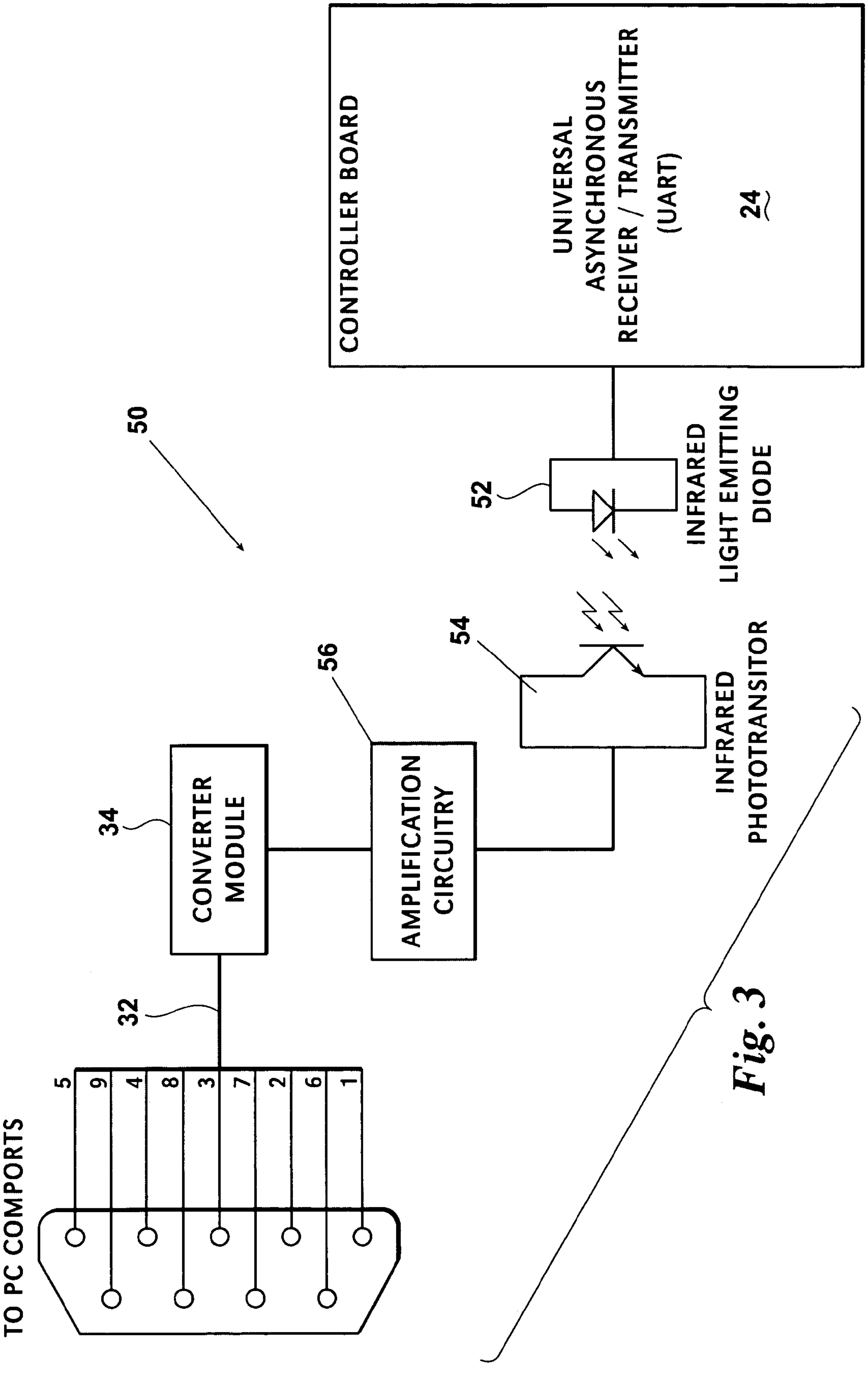
FIG. 3 schematically illustrates an alternative embodiment 50 of the inventive trolling motor diagnostic system.

Another embodiment 50 of the inventive trolling motor diagnostic system is depicted in FIGS. 3 and 4. The inventive diagnostic system 50 is essentially identical to the inventive diagnostic system 2 except that, rather than using a direct cable connection between the integral electronic diagnostic system 20 and the external diagnostic data processing system 22, the inventive system 50 utilizes a wireless diagnostic data transmission and receiving system. The wireless data and transmission receiving system preferably comprises: (a) an infrared light-emitting diode 52 which replaces the diagnostics connection port 26 of the inventive system 2 and (b) a corresponding infrared phototransistor 54 and amplifier 56 provided on the end of the external diagnostic data system cable 32 for receiving the IR signals transmitted by the infrared light-emitting diode 52. The diagnostic information provided by the embodiment 50 of the inventive system can be transmitted to the external diagnostic data processing system by simply activating the trolling motor and holding the IR photo transistor 54 over or otherwise in receiving proximity to the infrared light-emitting diode 52.

The wireless diagnostic data transmitting feature of the inventive diagnostic system 50 is particularly effective for allowing the diagnostic system to be potted in a manner such that the system is sealed from the environment and includes no connection ports or other openings which would be exposed to moisture or corrosion. As illustrated in FIG. 4, the inventive system 50 is preferably potted by encapsulating at least most of the integral electronic diagnostic system in an epoxy material or other covering 58. The integral electronic diagnostic system is preferably encapsulated in a manner such that only the infrared light-emitting diode 52 projects from the covering material 58.

Although the integral portion of the inventive diagnostic system 50 is completely potted in this manner, the system is still effective for transmitting any and all diagnostic information desired for external analysis. In addition, the potting of the integral electronic diagnostic system also facilitates heat transfer and assists in preventing the electronic system from overheating.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In an apparatus including an electric trolling motor having at least one operational subsystem and said trolling motor having an integral electronic controller for controlling said operational subsystem, the improvement comprising:

said trolling motor also having an integral electronic diagnostic system which will receive diagnostic information pertaining to said operational subsystem;

said integral electronic diagnostic system including a wireless infrared transmitter comprising an infrared light-emitting diode which, when said trolling motor is activated, will continuously and automatically transmit, in real time, said diagnostic information pertaining to said operational subsystem for wireless reception externally of said trolling motor;

said integral electronic diagnostic system being potted by encapsulation in a covering material such that said infrared light-emitting diode projects from said covering material and said integral electronic diagnostic system has no connection ports exposed to external environmental conditions;

a diagnostic data processing system located externally of said trolling motor; and said diagnostic data processing system including a wireless receiver comprising an infrared phototransistor which, when placed in receiving proximity to said infrared light-emitting diode, will receive said diagnostic information being continuously and automatically transmitted from said infrared light-emitting diode.

2. The apparatus of claim 1 wherein said integral electronic diagnostic system is encapsulated in an epoxy material.

3. The apparatus of claim 1 wherein:

said operational subsystem is a propulsion operation subsystem;

said trolling motor also includes a steering operation subsystem which is controlled by said integral electronic controller; and the improvement further comprises said integral electronic diagnostic system will receive diagnostic information pertaining to each of said propulsion operation subsystem and said steering operation subsystem and said wireless infrared transmitter will continuously and automatically transmit from said infrared light-emitting diode, in real time, said diagnostic information pertaining to each of said propulsion operation subsystem and steering operation subsystem for wireless reception externally of said trolling motor.

4. The apparatus of claim 1 wherein:

said integral electronic controller includes a receiver for receiving wireless motor control signals and the improvement further comprises said integral electronic diagnostic system will receive diagnostic information pertaining to said receiver and said wireless infrared transmitter will continuously and automatically transmit from said infrared light-emitting diode, in real time, said diagnostic information pertaining to said receiver for wireless reception externally of said trolling motor.

5. The apparatus of claim 1 wherein the improvement further comprises said wireless infrared transmitter comprising an universal asynchronous receiver/transmitter.

6. The apparatus of claim 5 wherein said integral electronic controller comprises a circuit board and the improvement further comprises said universal asynchronous receiver/transmitter being installed on said circuit board.

7. The apparatus of claim 6 wherein the improvement further comprises said integral electronic diagnostic system including an internal memory installed on said circuit board for storing historical data pertaining to said operational subsystem, said historical data being automatically transmitted from said infrared light-emitting diode by said integral electronic diagnostic system.

8. The apparatus of claim 1 wherein the improvement further comprises said integral electronic diagnostic system having an internal nonvolatile memory for storing historical data pertaining to said operational subsystem, said historical data being automatically transmitted from said infrared light-emitting diode by said integral electronic diagnostic system.

9. The apparatus of claim 1 wherein the improvement further comprises said diagnostic data processing system located externally of said trolling motor comprising an external computing device for analyzing said diagnostic information pertaining to said operational subsystem.

* * * * *